United States Patent
Chen

(10) Patent No.: US 9,007,206 B2
(45) Date of Patent: Apr. 14, 2015

(54) PATCH PANEL AND INTELLIGENT STRUCTURED CABLING SYSTEM

(75) Inventor: Chou-Hsin Chen, Keelung (TW)

(73) Assignee: Surtec Industries, Inc., Keelung (TW)

( * ) Notice: Subject to any disclaimer, the term of this patent is extended or adjusted under 35 U.S.C. 154(b) by 884 days.

(21) Appl. No.: 12/977,932

(22) Filed: Dec. 23, 2010

(65) Prior Publication Data

US 2011/0189886 A1 Aug. 4, 2011

Related U.S. Application Data

(63) Continuation-in-part of application No. 12/696,578, filed on Jan. 29, 2010, now abandoned.

(51) Int. Cl.
| | |
|---|---|
| *G08B 21/00* | (2006.01) |
| *H04Q 1/02* | (2006.01) |
| *H04Q 1/14* | (2006.01) |

(52) U.S. Cl.
CPC . *H04Q 1/09* (2013.01); *H04Q 1/13* (2013.01); *H04Q 1/136* (2013.01); *H04Q 1/149* (2013.01)

(58) Field of Classification Search
CPC ........ G08B 21/00; H01L 21/40; H01L 21/00; H01L 21/20
USPC .................. 439/49, 532, 489, 214, 540.1, 88; 361/733; 370/478; 340/568.2, 540; 343/700 OMS; 700/94
See application file for complete search history.

(56) References Cited

U.S. PATENT DOCUMENTS

| | | | | |
|---|---|---|---|---|
| 5,112,246 | A * | 5/1992 | Kawase et al. | 439/489 |
| 6,175,503 | B1 * | 1/2001 | Hogan et al. | 361/733 |
| 6,222,908 | B1 | 4/2001 | Bartolutti et al. | |
| 7,153,142 | B2 * | 12/2006 | Shifris et al. | 439/49 |
| 7,187,695 | B2 * | 3/2007 | Binder | 370/478 |
| 7,534,137 | B2 * | 5/2009 | Caveney et al. | 439/540.1 |
| 7,711,442 | B2 * | 5/2010 | Ryle et al. | 700/94 |
| 7,938,700 | B2 * | 5/2011 | Jacks et al. | 439/88 |
| 8,092,249 | B2 * | 1/2012 | German et al. | 439/489 |
| 2005/0170678 | A1 * | 8/2005 | Donahue, IV | 439/214 |
| 2006/0094291 | A1 * | 5/2006 | Caveney et al. | 439/540.1 |
| 2006/0116023 | A1 * | 6/2006 | Spitaels et al. | 439/532 |
| 2006/0181459 | A1 * | 8/2006 | Aekins et al. | 343/700 MS |
| 2008/0122579 | A1 | 5/2008 | German et al. | |

FOREIGN PATENT DOCUMENTS

| | | |
|---|---|---|
| GB | 2 374 941 A | 10/2002 |
| WO | WO 2006/063023 A1 | 6/2006 |

* cited by examiner

*Primary Examiner* — Steven Lim
*Assistant Examiner* — Kaleria Knox
(74) *Attorney, Agent, or Firm* — McGlew and Tuttle, P.C.

(57) ABSTRACT

A patch panel is provided including a patch panel frame, an indicator module connected to the patch panel frame, a microcontroller unit (MCU), a connector connected to the patch panel frame and a detection device for detecting a connection state at the connector. A circuit board interface is provided with a communication path between the indicator module and the MCU and between the detection device and the MCU. A communication unit is connected to the circuit board interface. The communication unit conveys signals between any one of patch panels of a group, between groups of patch panels, between the patch panel and a control unit and between the group of patch panels and the control unit.

20 Claims, 17 Drawing Sheets

PATCH PANEL AND INTELLIGENT STRUCTURED CABLING SYSTEM

CROSS REFERENCE TO RELATED APPLICATIONS

This application is a continuation-in-part application of application Ser. No. 12/696,578 filed Jan. 29, 2009 now abandoned and now pending, the contents of which are incorporated herein by reference.

FIELD OF THE INVENTION

The invention relates to telecommunication and data networks and more particularly to an intelligent structured cabling system including one or more patch panels each with a plurality of telecommunication and data jacks and one or more patch cords with the system including an insertion/removal detection capability.

Patch panels have been provided for data and telecommunication networks (networks). Such patch panels typically include a number of jacks hardwired to insulation displacement contacts (IDCs), to which connection wires are terminated. For local area network systems and other applications, the jacks are particularly RJ-45 (RJ45) jacks with the jacks connecting to wiring associated with one or more data/telecommunication devices such as a personal computer, voice over IP telephone or similar device. A patch cord plug may be inserted in one of the jacks while another plug of the same patch cord may be inserted into another similar jack of a patch panel or into a jack of a switch or other similar device. This allows networks to be configured in a simple and reliable manner.

Switches are often provided with jacks that have indicator lights to indicate the connection of the line to the end device or network. For example, most switches include lights to indicate a 10BaseT, a 100BaseT or a 1000BaseT connection. Providing such an indication is straightforward based on the switch or similar device being an active component and being able to sense the signal over the line. Network cards, modems and other active components typically also have similar indicator lights. Patch panels are typically non-active facilities. Patch panels provide the mechanical and electrical connection of the RJ45 plug of the patch cord to the RJ45 jack and from connected IDCs to wires. There has been some interest in providing network managers with information to provide assurance that a proper electrical connection is being made at the patch panel. In particular, with patch panels such as large patch panel arrangements, it is beneficial to know that the patch cord plugs are actually properly inserted into the patch panel jacks.

U.S. Pat. No. 6,222,908 discloses a method and device for identifying a specific patch cord connector as it is introduced into or removed from a telecommunications patch system. The method and device include special connectors of the patch cord in which each of the connectors has a unique identifier. The patch panel itself is provided with an interface module that is near the connector port. When the connector is inserted into a port, the patch cord connector passes through a structure with a sensor that reads the identifier. The system involves a high cost including the cost of specialized patch cords each having a unique identifier.

U.S. Pat. No. 7,153,142 discloses a retrofit kit for an interconnect cabling system. The system allows the user to obtain connectivity status, or a map, of a cabling system in the data and/or voice network. The retrofit kit includes a plurality of replacement patch cords. The replacement patch cords forward scanning signals. Adapter panels are employed that comprise spring electrical contacts as well as indication elements (connectivity status indicators—CISs) which are each associated with a corresponding socket (jack). Each of the spring electrical contacts allows transmitting and/or receiving of the scanning signals to allow identification of the connectivity status of the patch panel. The system also requires specialized patch cords and involves expense with regard to retrofitting patch panels with the adapter panels having spring electrical contacts and the CISs.

U.S. Pat. No. 7,534,137 discloses a method and apparatus for patch panel patch cord documentation and revision. The patch panel includes ports (including RJ jacks) that are provided with out of band contacts to monitor and report patch cord connectivity information. The out of band contacts send information regarding identification and connectivity status of the associated patch panel port along a ninth wire of a patch cord. This system relies on special patch cords having an additional ninth wire. Accordingly, the system involves specialized patch panels and specialized patch cords and does not allow the use of standard patch cords. This entails additional expense and presents limitations as to adopting the system.

SUMMARY OF THE INVENTION

It is an object of the invention to provide an intelligent structured cabling system and a patch panel for use in the intelligent structured cabling system.

According to the invention, the patch panel comprises a patch panel frame, an indicator module connected to the patch panel frame, a microcontroller unit (MCU), a connector connected to the patch panel frame and a detection device for detecting a connection state at the connector. A circuit board interface is provided with a communication path between the indicator module and the MCU and between the detection device and the MCU. A communication unit is connected to the circuit board interface. The communication unit conveys signals between any one of patch panels of a group of patch panels, between groups of patch panels, between the patch panel and a control unit and between the group of patch panels and the control unit.

The circuit board interface and the frame may define a carrier. The indicator module and the MCU module may be removably mounted on the carrier. The detection element may form a part of the circuit board interface.

The connector may advantageously be a modular female connector such as a keystone jack. The jack may have a housing defining a connector opening for receiving a male connector and defining an adjacent detection element opening. The modular female connector is mounted on the frame. The detection element is inserted into the connector opening through the detection element opening, upon mounting the modular female connector on the frame, for detecting the insertion of the plug in the connector opening.

The detection element may convey one of two signals to at least one of the indicator module and the MCU module through the circuit board interface. One of the two signals may indicate that a plug is inserted into the female connector and the other of the two signals may indicate the plug is removed from the female connector.

The connector may be one of a plurality of connectors with each connector being a modular female connector. The detection element may be one of a plurality of detection elements with each detection element forming a part of the circuit board interface and being associated with a corresponding one of the female connectors. Each detection element may be inserted into the corresponding connector opening through the detection element opening upon mounting the modular female connector on the frame for detecting the insertion of the corresponding plug in the corresponding connector opening. Each of the plurality of modular female connectors that are mounted on the frame may be connectable to the patch panel frame and disconnectable from the patch panel frame for replacement thereof.

The communication unit may comprise a communication element such as an RS 485 interface with an RS485 communications port. The communication unit may include the MCU and/or a communication chip cooperating with the communication element. The control unit may be a central control unit comprising a computer. The female connector may be a registered jack (RJ) modular connector.

The circuit board interface may include at least one of circuit traces and conductive through holes defining circuit board interface communication paths. The circuit board interface may include an MCU interface for connecting the MCU module to the circuit board interface and for disconnecting the MCU module from the circuit board interface for replacement thereof. The circuit board interface may include the detection elements as parts of the circuit board interface.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
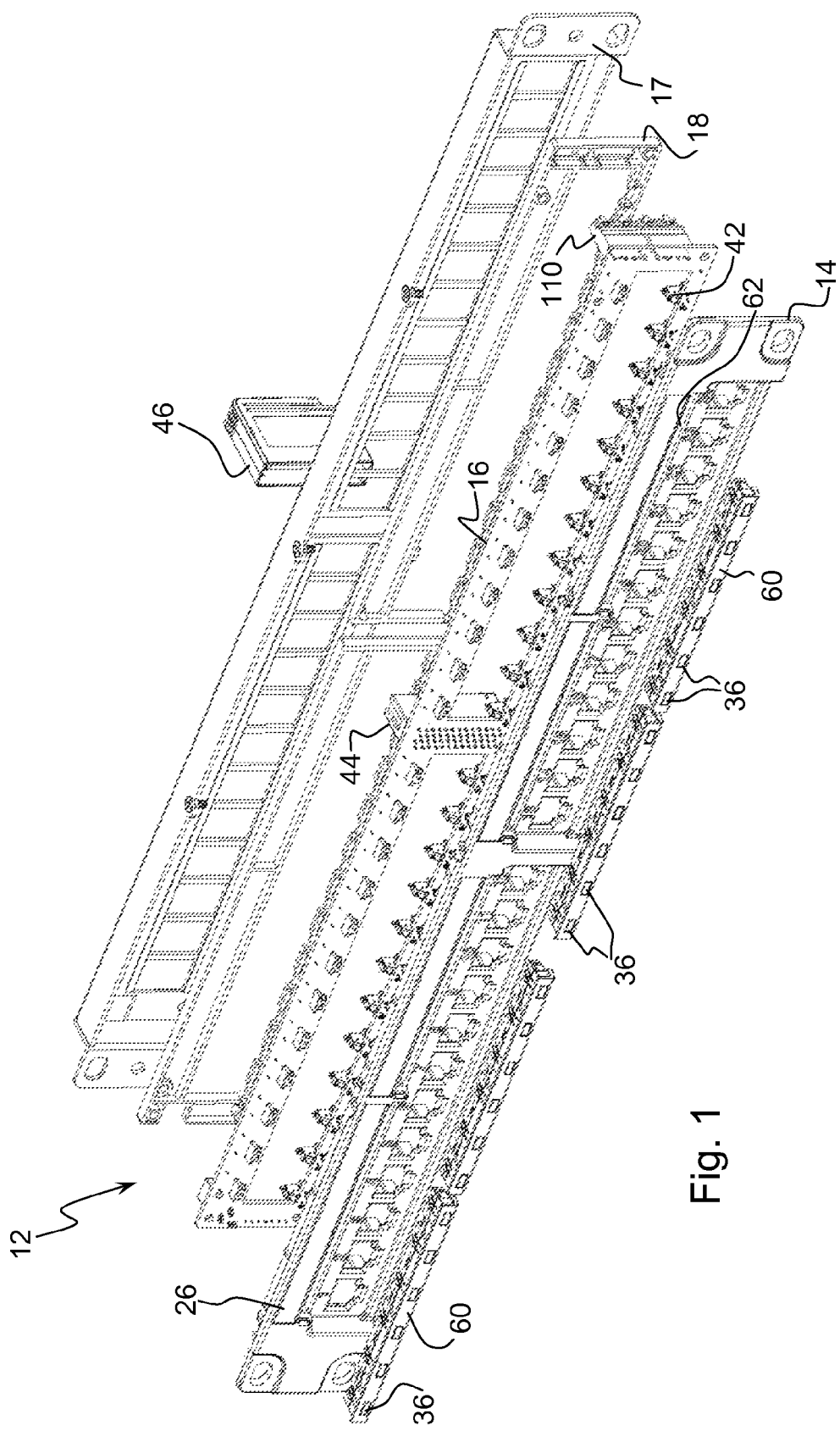
FIG. 1 is a perspective exploded view of a patch panel according to the invention.

Referring to the drawings in particular, the invention comprises an intelligent structured cabling system that includes one or a plurality of patch panels 12. Each patch panel 12 includes a cover/support bracket 14 with rack mounting holes for connection of the patch panel 12 to a rack 10 for rack mounting. Each patch panel 12 also includes a circuit board interface 16 with frame elements 18. A rear cover 17 closes the assembly with the circuit board interface 16 and frame elements 18 disposed between the rear cover 17 and the panel cover 14.

Figure 2:
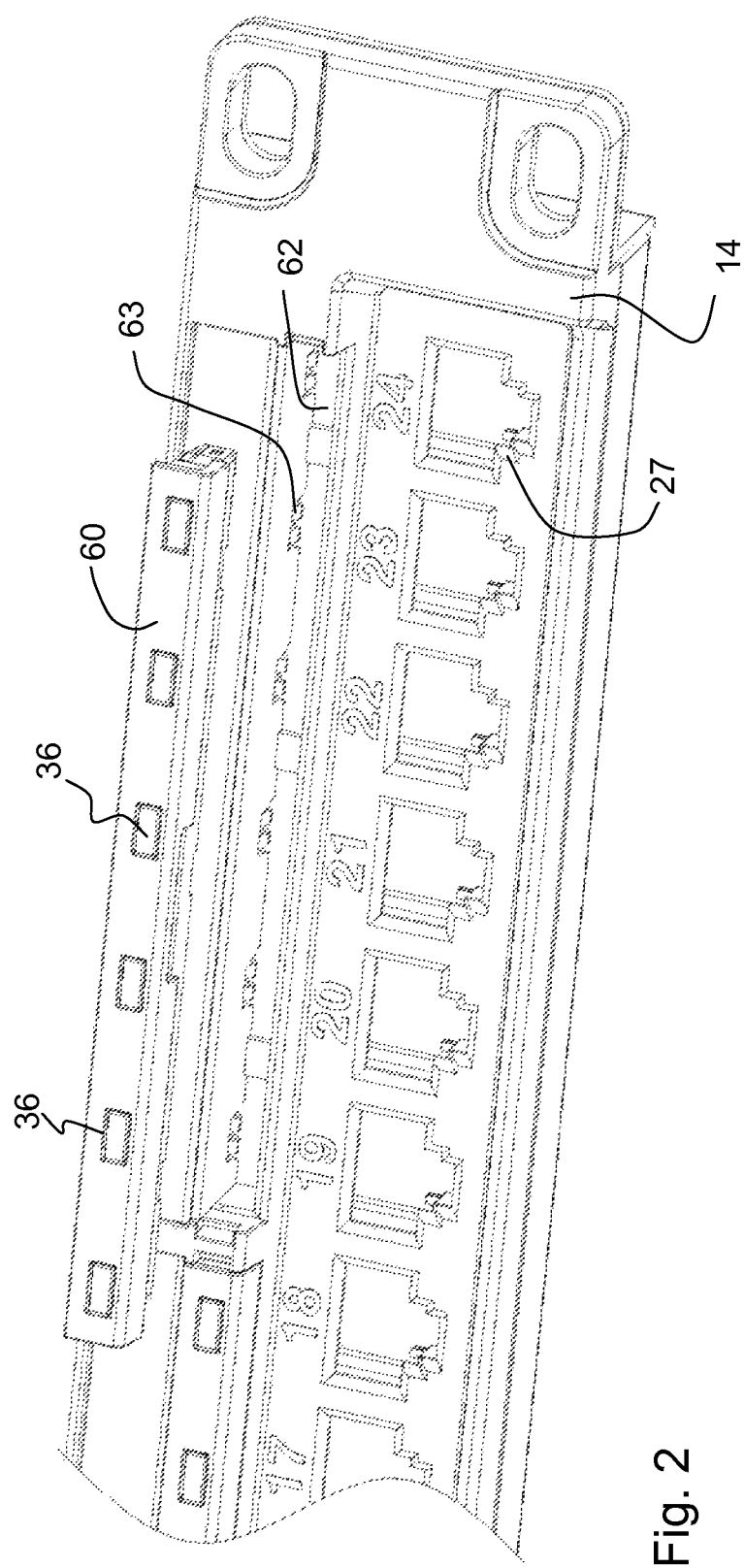
FIG. 2 is a cutaway exploded perspective view showing the front of the patch panel with an indicator module removed from an indicator module seat.
Figure 3A:
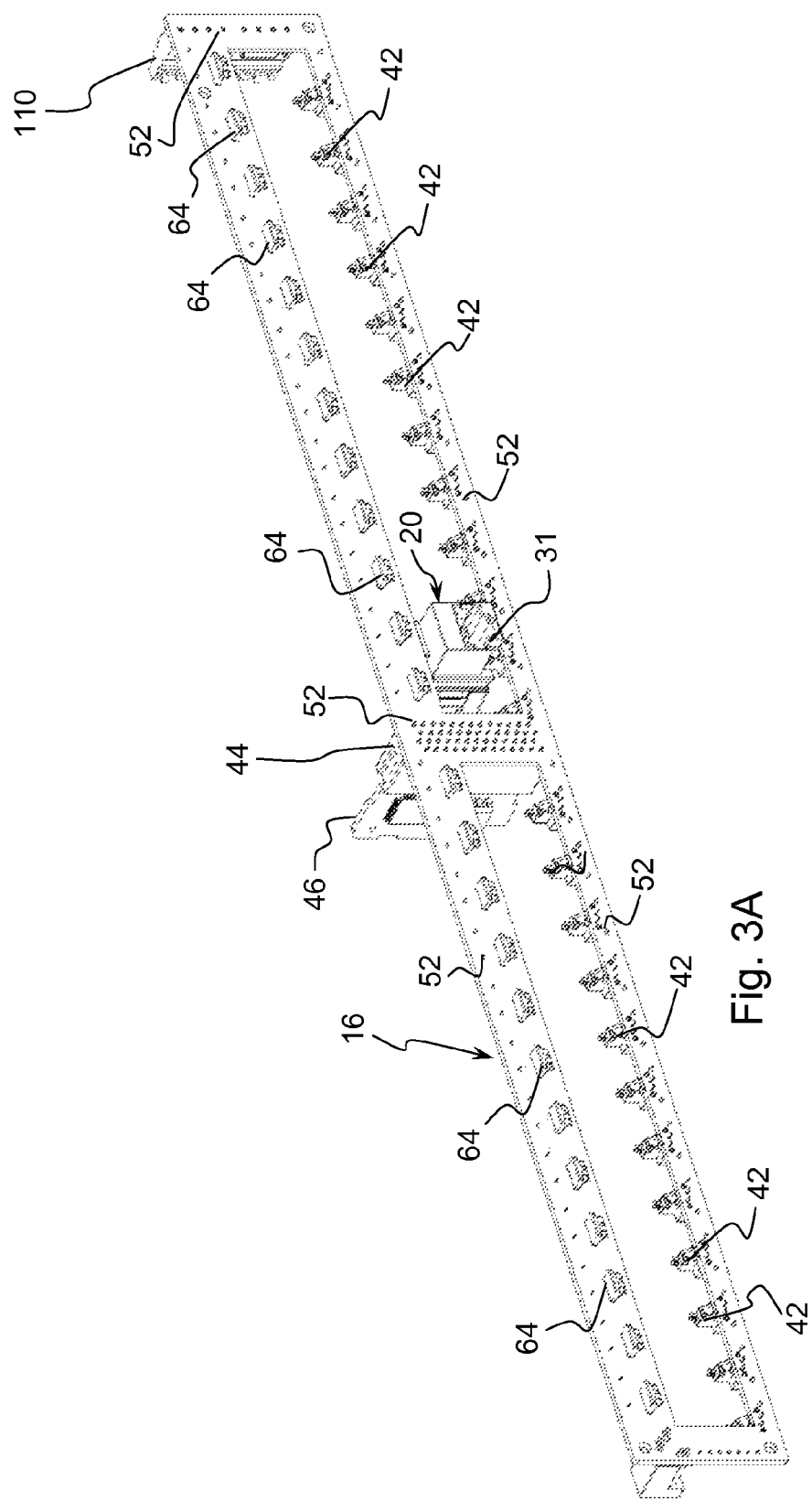
FIG. 3A is a front perspective view showing the circuit board interface detached from the other components of the patch panel.

As shown in FIG. 2, the panel cover 14 includes indicator module receiving openings 62. Each indicator module receiving opening 62 provides a receiving space for receiving a corresponding one of the indicator modules 60. A plurality of indicator module bases 64 (FIG. 3A) have contacts 63 that extend into each indicator module receiving openings 62. Each indicator module 60 has a plurality of light emitting diode (LED) indicators 36. Each indicator 36 has contacts 37 that electrically connect to contacts 63 of the indicator module bases 64. The contacts 37 and 63 provide the electrical connection to power the LEDs and also cooperate to physically hold each indicator modules 60 in the respective indicator module receiving openings 62. The indicator modules 60 can be removed and replaced, if there is a failure of any of the indicators 36

The panel cover 14 has a plurality of access openings 27 that align with plug insertion openings 30 of the various keystone jacks 20. The LED indicators 36 are provided in an equal number to the access openings 27 and to the ports (jacks 20) that may be associated with the access openings 27. The panel cover 14 also has a labeling section 26 for providing identifying labeling for the associated ports (keystone jacks 20). A cover may be provided to cover the labeling section 26.

The circuit board interface 16 includes circuit traces and plated trough holes that provide circuit transmission paths 52. The circuit board interface 16 includes the indicator module bases 64 with electrical coupling contacts 63 for connection to the contacts 37 of the LED indicators 36 of the each indicator module 60. A microcontroller unit (MCU) 48 is provided as part of a microcontroller unit module 46, which can be connected and disconnected from the patch panel 12 and may be replaced if there is a failure of the processor/controllers. The circuit board interface 16 includes a MCU interface 44 that receives the MCU module 46. The circuit board interface 16 also includes detection elements 42, with each associated with one of the various keystone jacks 20. Each detection element 42 includes circuit element first conductive portion 32 and a circuit element second conductive portion 34 that are part of a detection circuit 40.

Figure 3B:
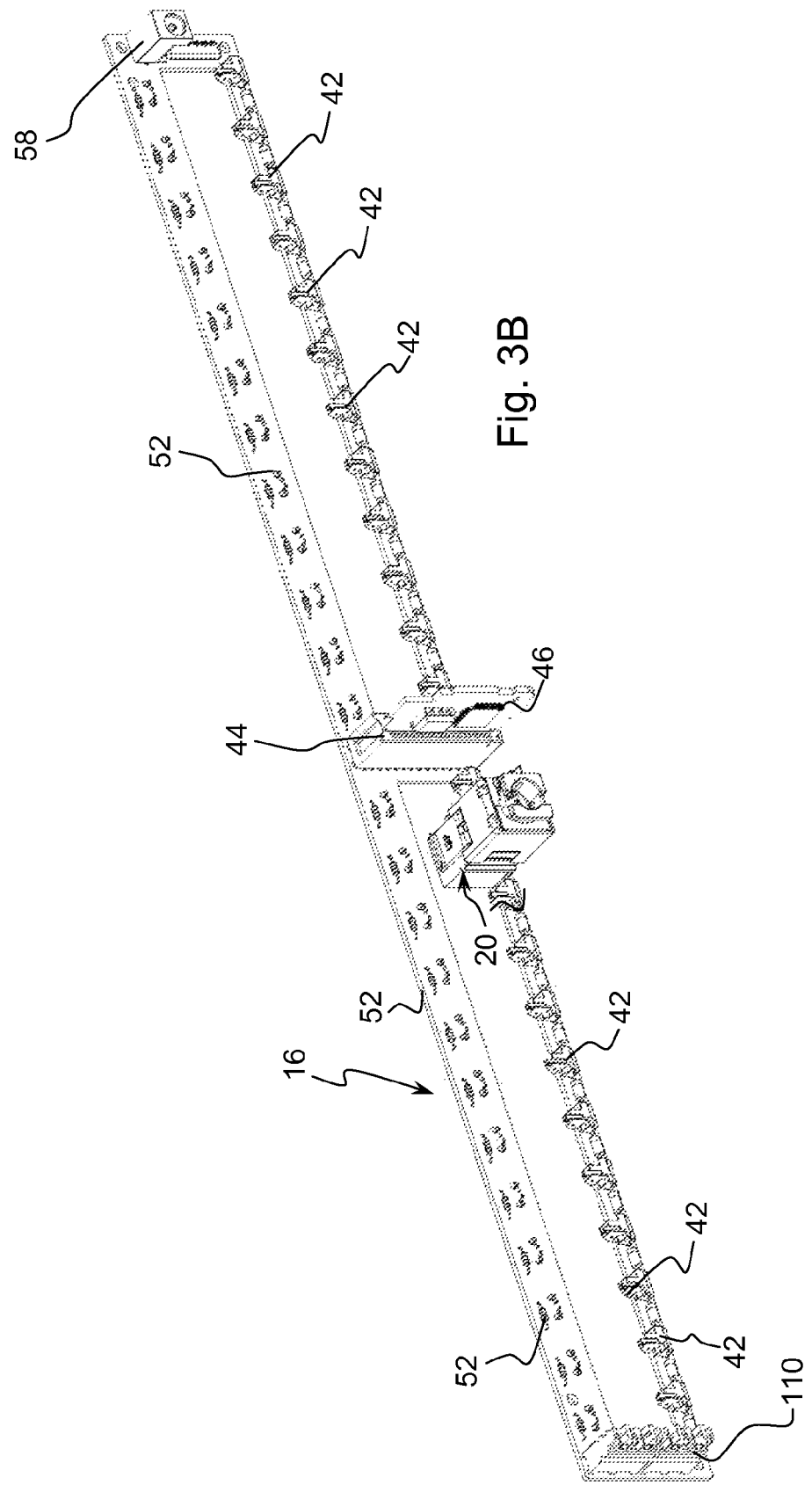
FIG. 3B is a rear perspective view showing the circuit board interface detached from the other components of the patch panel.

As can be seen in FIG. 3B, the circuit board interface 16 includes a communication element 110. Communication element 110 is a so called 110 type connector interface that includes plural contacts including two contacts (pins) for receiving data and two contacts (pins) for sending data. The communication element 110 is connected to the MCU 48 via circuit transmission paths 52 of the circuit board interface 16. The communication element 110 allows the MCU 48 to communicate with other MCUs 48 of other patch panels 12 or to communicate with a central control unit in the form of a personal computer (PC) 70 via a communication chip 80 that may also be provided as part of the MCU module 46. The circuit board interface 16 also has a power connection 58 for supplying power for operation of the indicators 36 and the features of the MCU module 48. FIG. 3B also shows the MCU module 46 with a cover 50 removed to show the MCU circuit board 45, MCU 18 and communication chip 80. The MCU module 46 with the communication chip 80 allows the patch panel 12 to function as a master panel 92. The master patch panel 92 has a MCU 48 that collects data from other MCUs 48 of other patch panels 12 of a rack or several racks and forwards the data to an MCU 48 of another rack or to the control unit 70.

The MCU module interface 44 has a plurality of pins which pass into plated through holes providing the circuit transmission paths 52 of the circuit board of interface 16. The transmission paths 52 extend between the insertion/removal detection elements 42 and the MCU module interface 44 and between the electrical coupling contacts 63 of the indicator module base 64 and the MCU module interface 44. The transmission paths 52 also connect between the MCU module interface 44 and the communication element 110. The communication element 110 is shown as having IDCs, which are in turn connected to transmission paths 112 or 94 (e.g., wire(s) of a cable) to provide a communication path to a control unit (PC) 70 or other communication elements 110. Each patch panel 12, 12' includes a communication unit that includes the communication element 110, 120 with associated communication paths 112, 94 and the MCU 48. In the case of a master patch panel 92, the communication unit also includes a communication chip 80.

Figure 4:
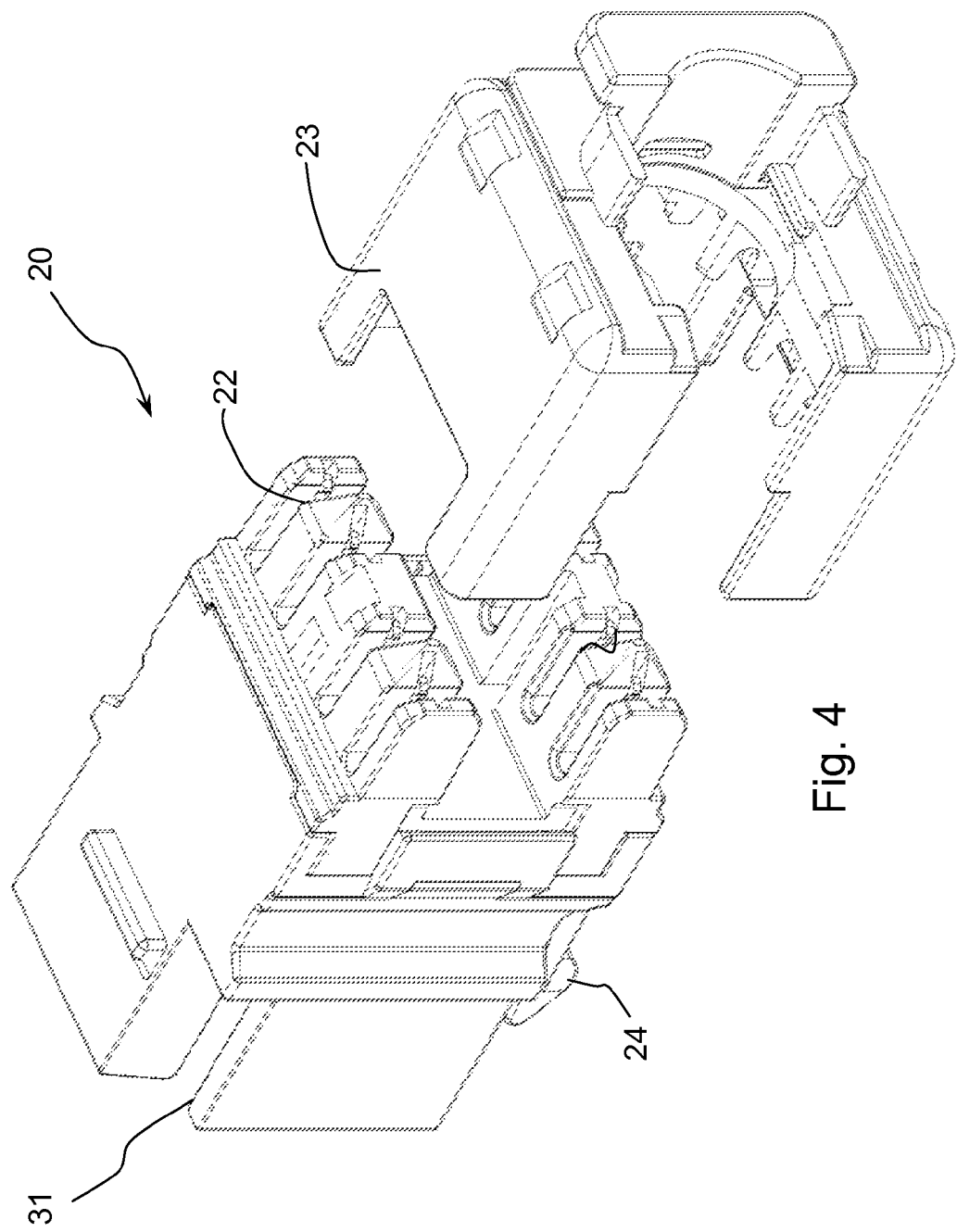
FIG. 4 is a perspective exploded view showing an individual keystone jack (female connector) with an IDC cover removed.

The patch panel system includes a plurality of individual keystone jacks 20 that have insulation displacement contacts (IDCs) 22 as shown in FIG. 4. Each jack 20 has a female connector opening 30 as well as an adjacent connected detector opening 31. The individual keystone jacks 20 also have a latch structure 24 and an IDC cover 23.

Figure 5:
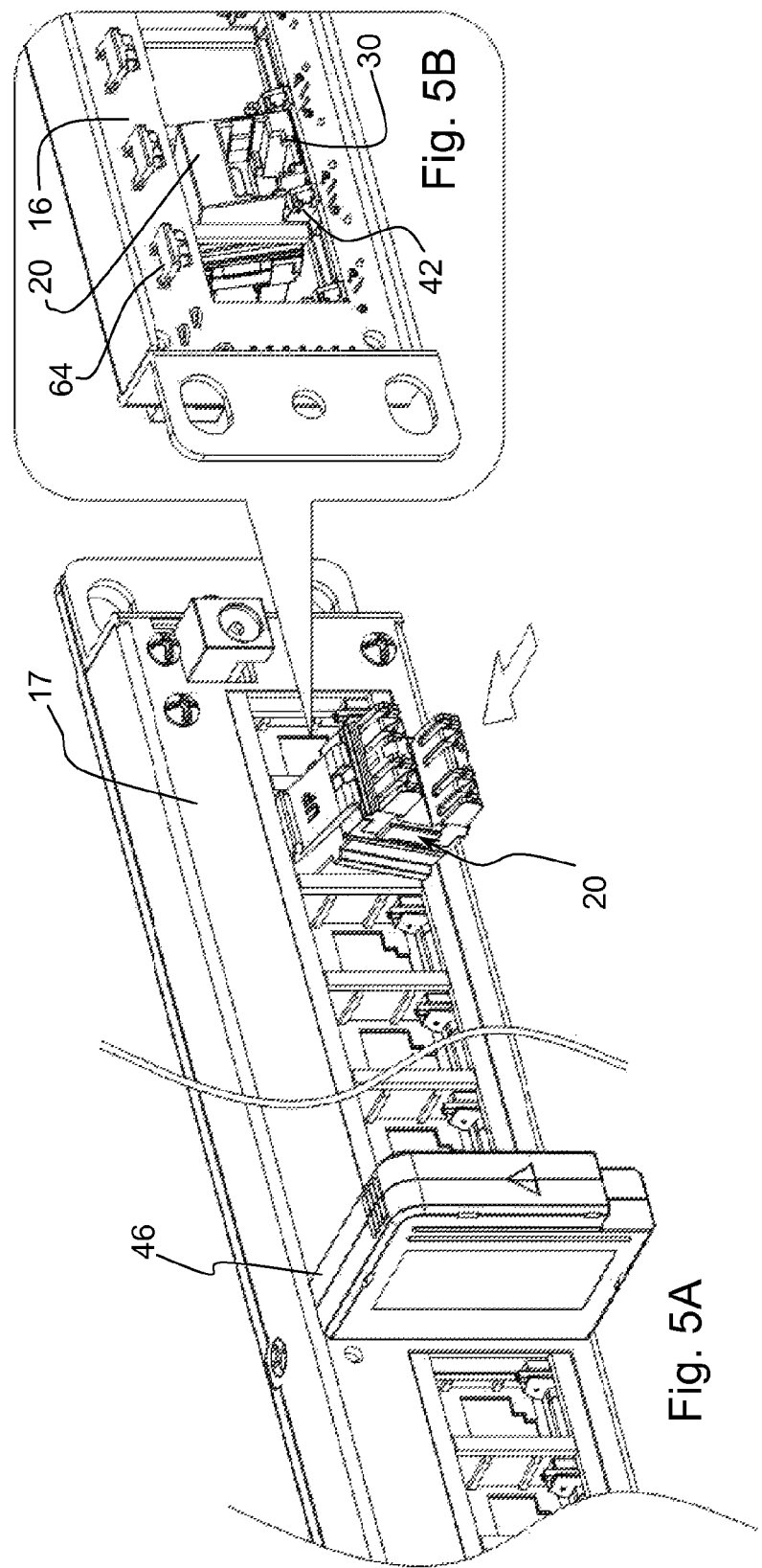
FIG. 5A is a cutaway rear perspective view showing a position of a keystone jack as it is just positioned at an opening and aligned with the opening of the keystone patch panel.
FIG. 5B is a cutaway front perspective view showing the position of the keystone jack of FIG. 5A.

As can be seen in FIG. 5A, the rear cover 17 cooperates with the other structure of the patch panel 12 to provide rear openings 19. Each opening 19 can receive an individual keystone jack 20. The patch panel 12 receives the individual keystone jacks 20 such that the keystone jacks 20 can be removed and replaced. The latching structure 24 of the individual keystone jacks 20 cooperates with the rear cover 17 to mount and hold each jack 20 in the opening 19. FIG. 5A shows the position of a jack 20 as it is just positioned at an opening 19 and aligned with the opening 19.

Figure 6:
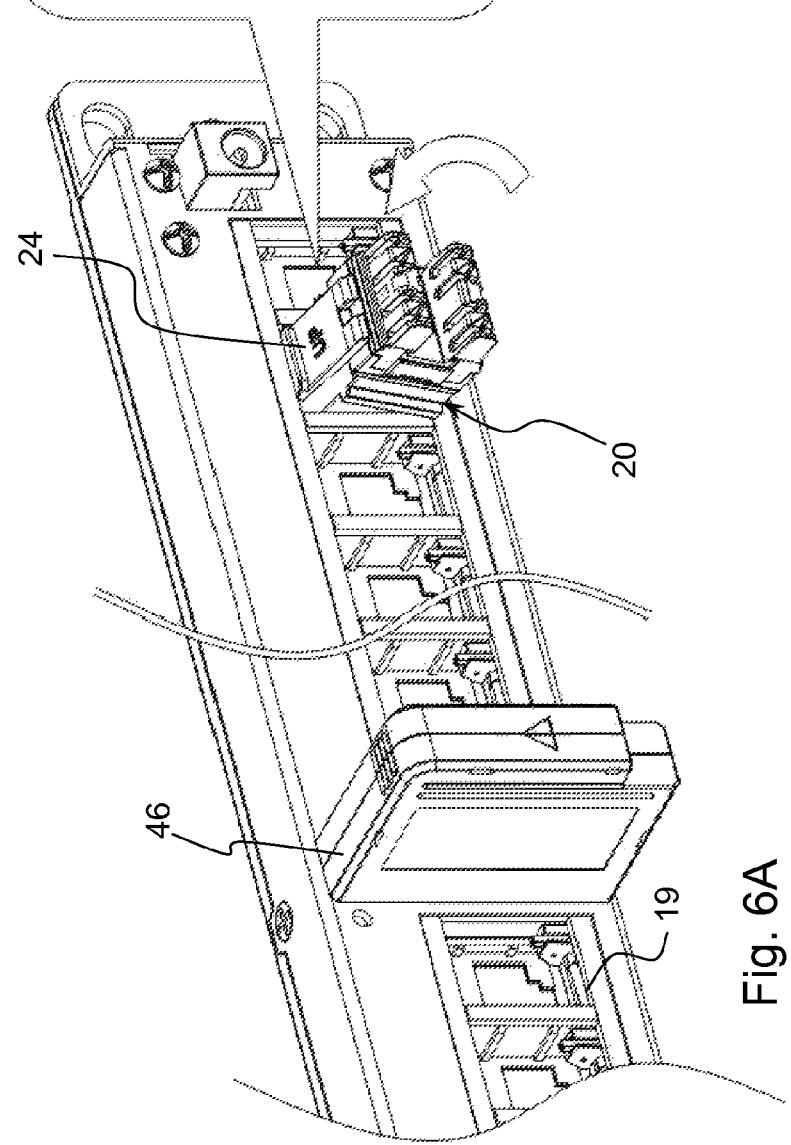
FIG. 6A is a cutaway rear perspective view showing a position of a keystone jack as it is pushed further into the opening.
FIG. 6B is a cutaway front perspective view showing the position of the keystone jack of FIG. 6A.
Figure 7:
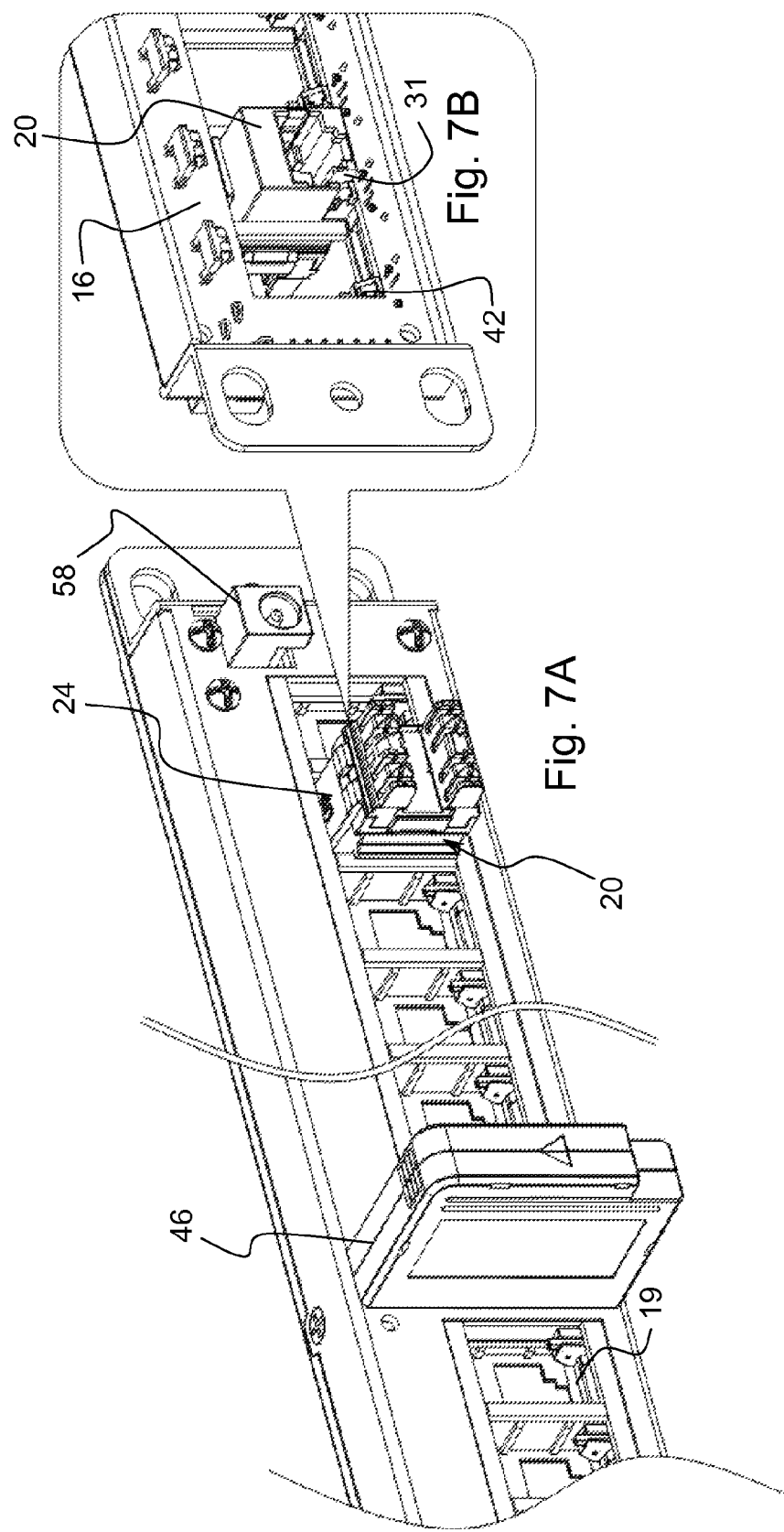
FIG. 7A is a cutaway rear perspective view showing a position of a keystone jack after it is seated and latched in position in an opening.
FIG. 7B is a cutaway front perspective view showing the position of the keystone jack of FIG. 7A.

FIG. 5B shows the same jack 20 in the position shown in FIG. 5A but from the front side of the circuit board interface 16. FIGS. 5B, 6B and 7B show how each jack 20 receives an associated detection element 42 in the detector opening 31 as the jack 20 is moved into its seated and latched position. As this occurs, the detection element 42 slides into the detector opening formed in the jack 20. In the latched position, the detection element 42 is positioned such that the first conductive portion 32 and second conductive portion 34 extend into the connector opening 30 of the jack 20.

FIG. 6A shows the same jack 20 as is pushed further into the opening 19. This position of the same jack 20 is shown at the front side of the circuit board interface 16 in FIG. 6B.

FIG. 7A shows the same jack 20 after it is seated and latched in position in an opening 19. The same jack 20 is shown in FIG. 7B in a seated connected position in which the detection element 42 is positioned such that the first conductive portion 32 and second conductive portion 34 extend into the connector opening 30 of the same jack 20.

Figure 8:
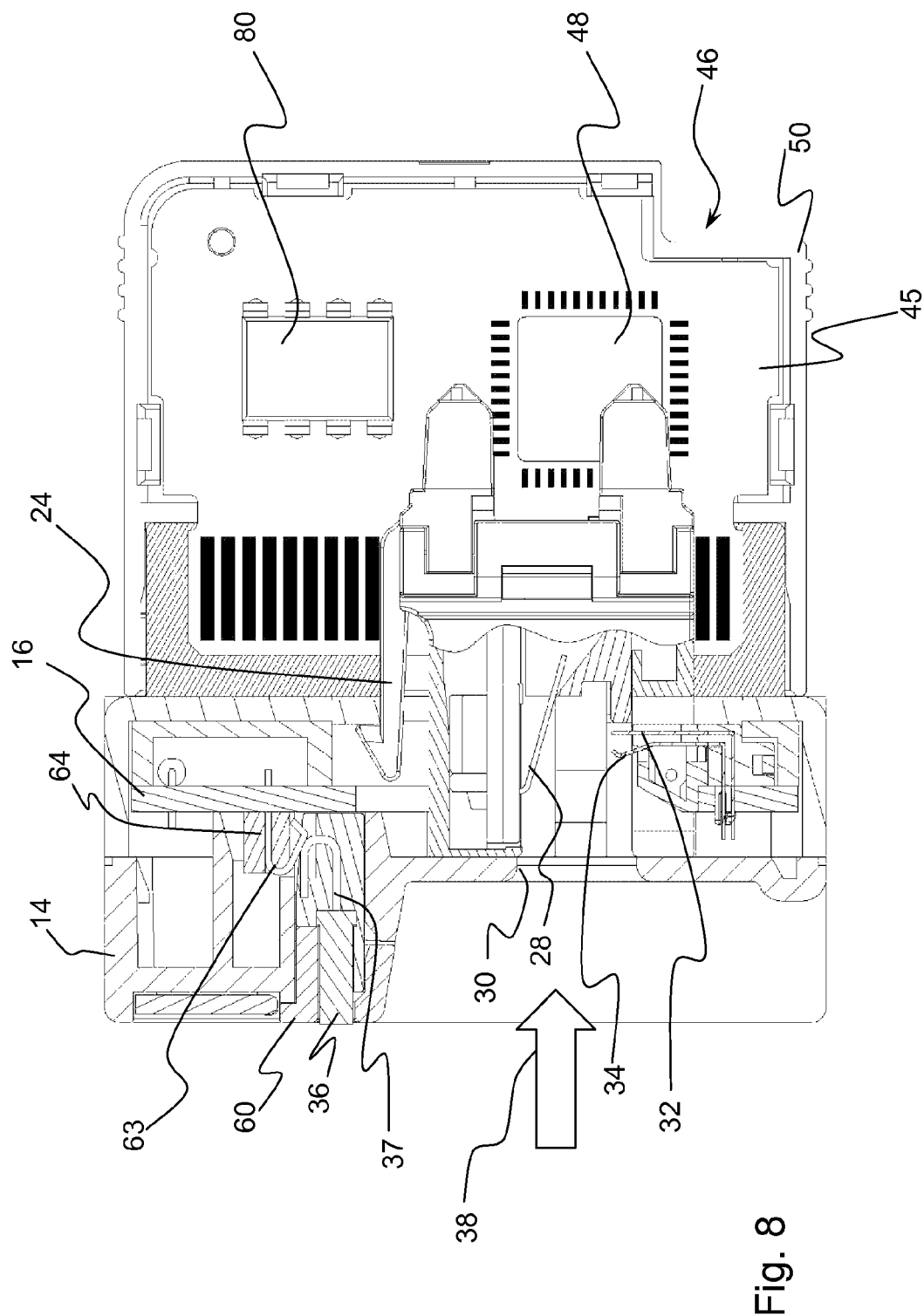
FIG. 8 is a cross-sectional view of the patch panel showing the region of a plug opening of an individual keystone jack and showing a circuit detection element as well as the microcontroller unit module connected at the microcontroller unit module interface.
Figure 9:
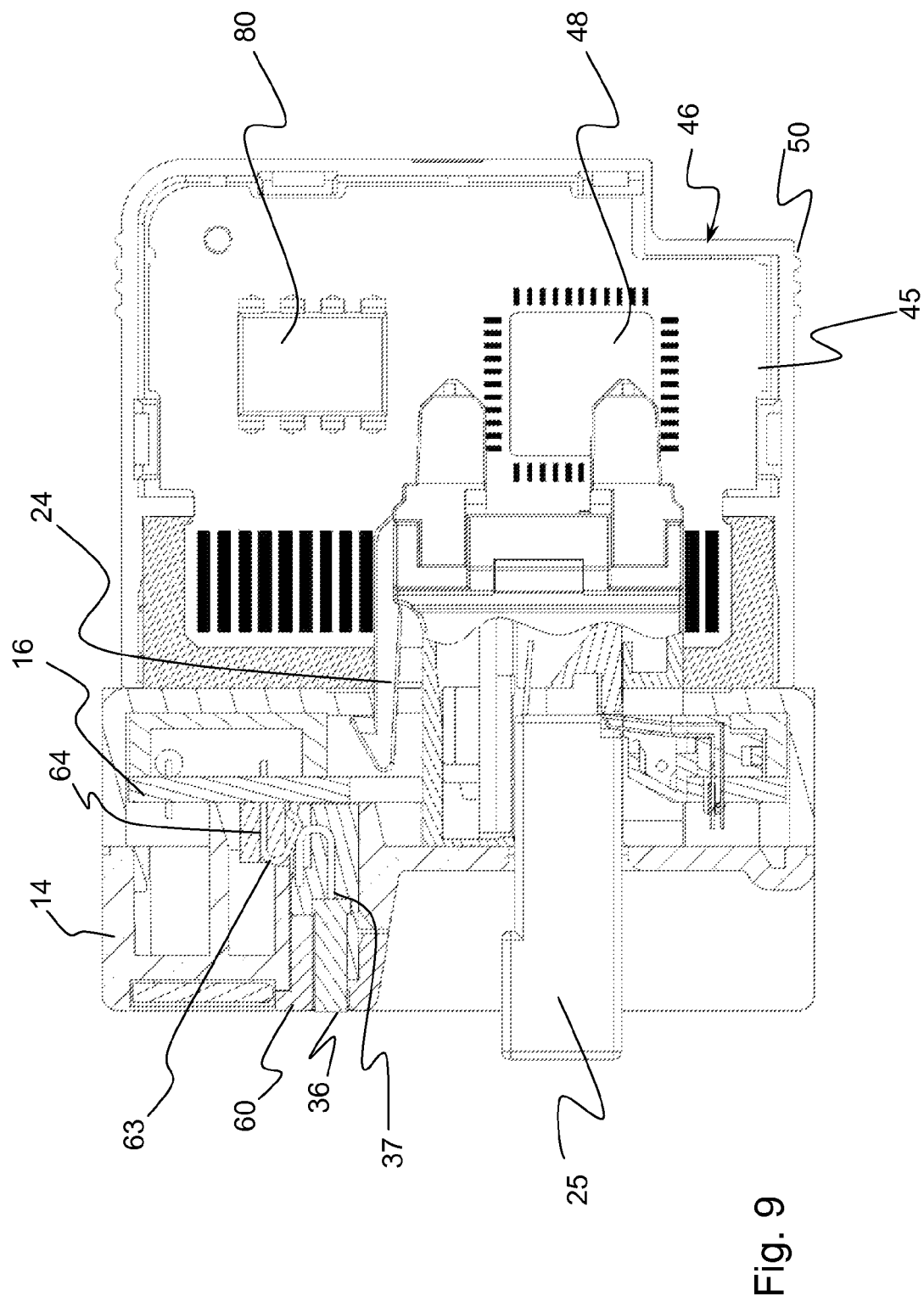
FIG. 9 is a cross-sectional view, similar to FIG. 8, showing a patch plug (male connector) inserted in the plug opening of an individual keystone jack (female connector) showing the circuit detection element with circuit element first conductive portion and circuit element second conductive portion in contact.

FIG. 8 shows an individual keystone jack 20 mounted to back cover 17 with the keystone jack 20 connected to and forming a part of the patch panel 12. FIG. 8 shows the plug (male connector) insertion opening 30 as well as the plug insertion direction 38. The detection element 42 is shown with conductive portions 32 and 34 positioned in the insertion opening 30. In FIG. 8, the detection circuit 40 is an open circuit. In FIG. 9, a plug 26 is shown inserted in the opening 30 with this resulting in contact between the conductive portions 32 and 34 of the detection element 42. This allows for the plug insertion state (the male connector/plug 25 being inserted in the female connector/jack 20) to be signaled to the MCU 48. Each of the LED indicators 36 provide an indication of the plug insertion status of a respective RJ plug 25 in one of the keystone jacks 20, as described below with reference to FIGS. 14-16. The data as to the various plug insertion states as well as the address of the port (jack 20) may be maintained at the MCU 48 and may be sent to a master MCU 48 or to the control unit 70.

Figure 10:
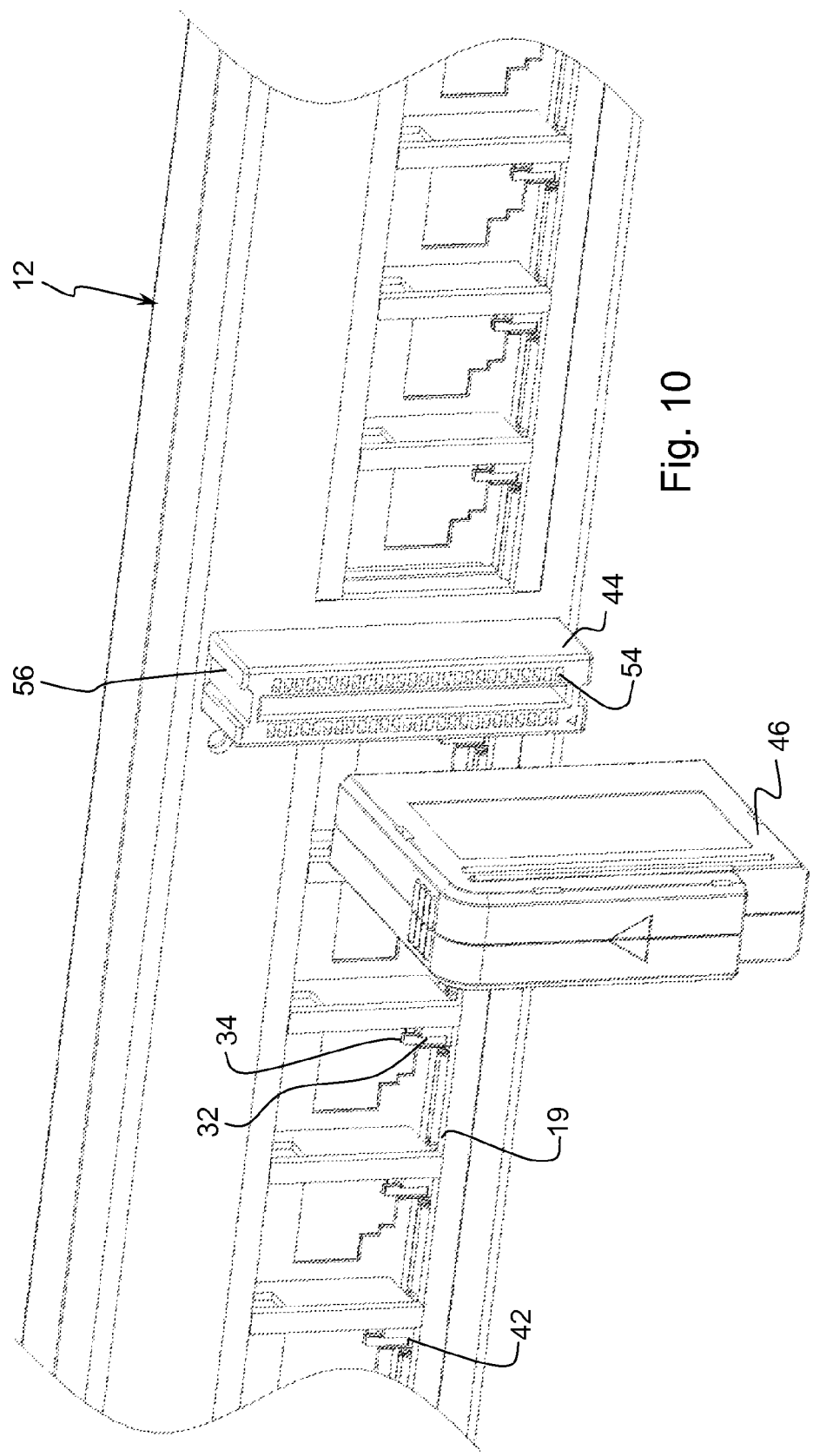
FIG. 10 is a cutaway exploded perspective view showing a microcontroller unit module removed from a microcontroller unit module interface of the circuit board interface at the back of the patch panel.

FIG. 10 shows the rear side of the keystone jack patch panel 12, particularly showing the MCU module interface 44. The MCU module interface 44 has contacts with openings 54 which receive contact pins from the MCU module 46. The MCU interface 44 advantageously has a connector guide 56 which both guides the MCU module 46 and helps retain the module 46 in a proper connected state. The MCU module 46 has a MCU cover 50 with a corresponding complementary guide surface to that of the surface of connection guide 56.

Figure 11:
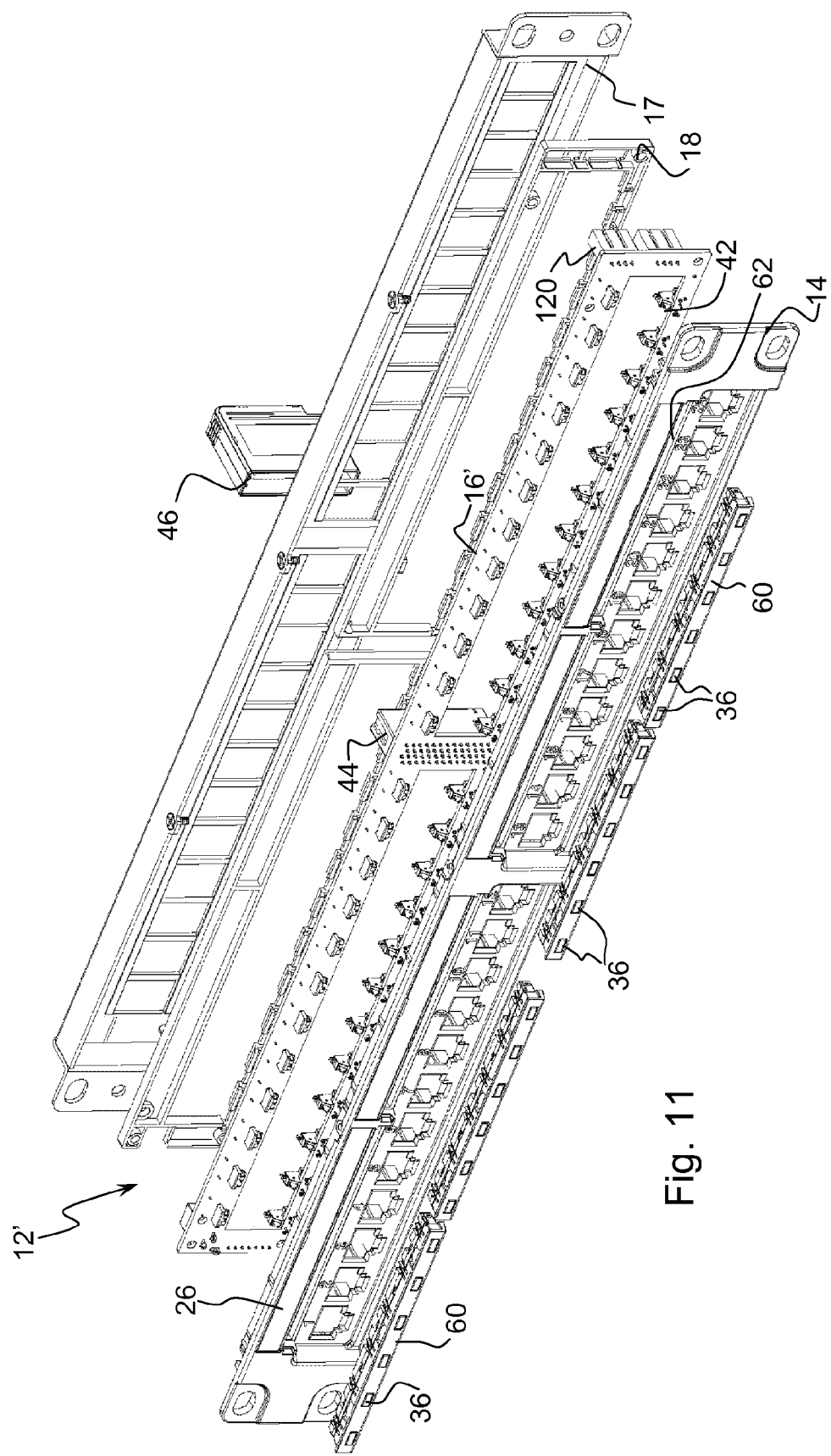
FIG. 11 is a perspective exploded view of a patch panel according to another embodiment of the invention.
Figure 12:
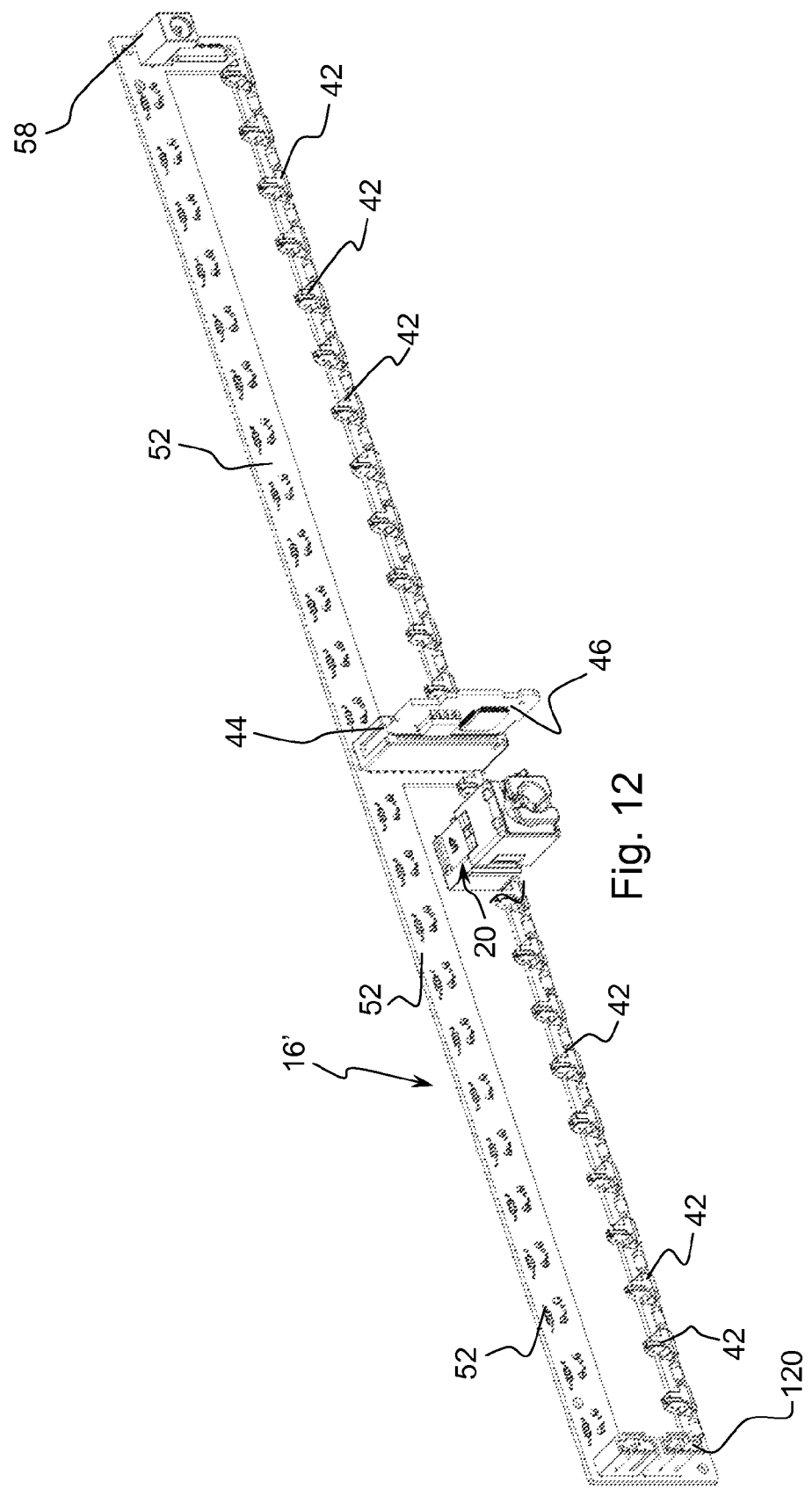
FIG. 12 is a rear perspective view showing a circuit board interface detached from the other components of the patch panel according to the embodiment of FIG. 11.

FIG. 11 shows a patch panel 12' according to an alternative embodiment of the invention. The patch panel 12' is identical to the patch panel 12 except that instead of the communication element 110, a communication element 120 is provided. Communication element 120 is a wire to board connector that includes a socket with contacts connected to circuit transmission paths 52. A plug and wire 112/94 is provided with the plug inserted in the socket of communication element 120 and the further plug connected to another communication element 120 of another patch panel 12' or connected to a similar communication element at the control unit 70. FIG. 12 further shows the sockets of the communication element 120.

Figure 13:
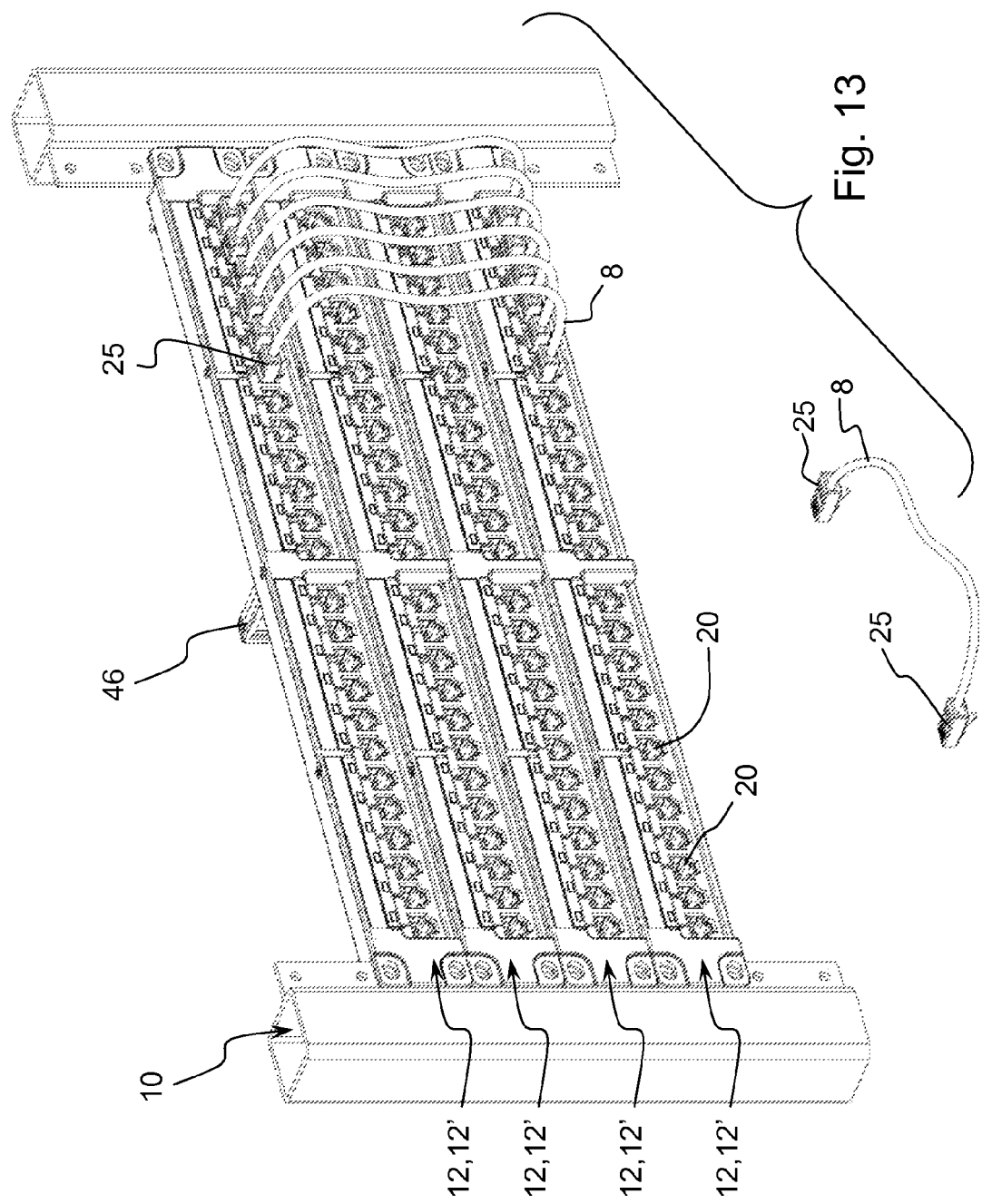
FIG. 13 is a front perspective view showing several patch panels according to the invention connected to a common rack and showing patch chords.

FIG. 13 shows a plurality of patch panels 12 (or 12') connected to a rack structure 10. Individual keystone jacks 20 provide ports of the patch panel. The individual keystone jacks 20 receive a plug 25 of the patch cord 8 which has another plug 25 connected to another keystone jack 20. The invention provides a system in which the connection state of each port is known and this information can be presented via the control unit 70. Software at the control unit 70 may have associated data as to the identity of wires connected to the IDCs 22 of the particular port (jack 20). The software of the control unit 70 may be used to manage the system which may include a graphic user interface such that the various connections can be viewed. Further, the various connections can be individually labeled such that the status of connections can be viewed based on the plug insertion state of a plug 25 at any particular port (jack 20).

Figure 14:
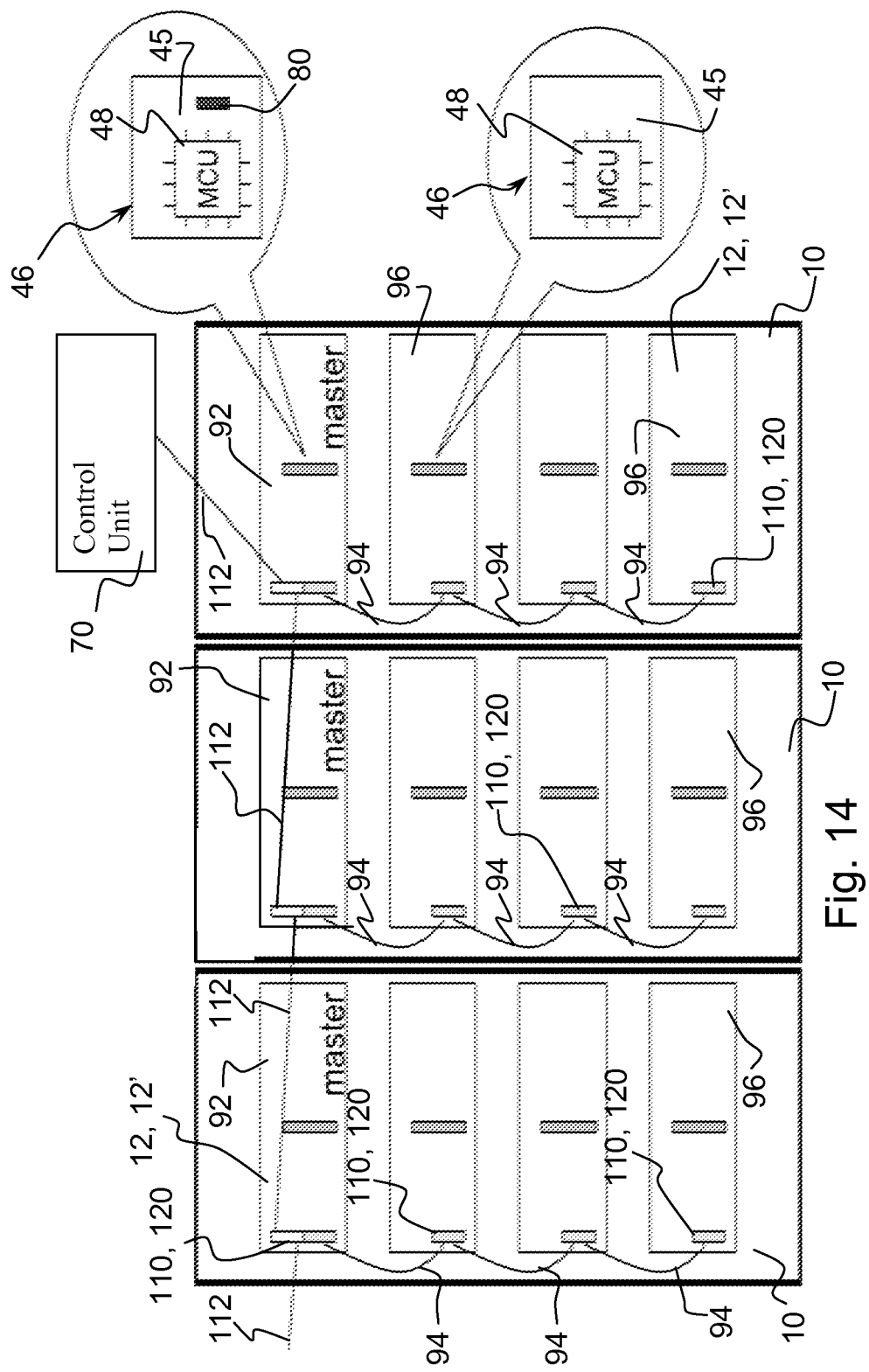
FIG. 14 is a schematic rear view of the rack showing connections between patch panels and a connection for a central control unit.

FIG. 14 schematically illustrates connections between adjacent patch panels 12, 12' of a common rack 10. Within the one rack 10 one of the patch panels 12, 12' is a master patch panel 92 which includes an MCU module 46 with a circuit board 45 having both an MCU 48 as well as a communication chip 80. The other patch panels 12, 12' are non-master patch panels 96 that have an MCU module 46 with a circuit board 45 and an MCU 48 but do not have or need not have a communication chip 80. The MCUs 48 of the non-master patch panels 96 have a simple store and forward function, namely receiving data as to the status of the circuits 40 and storing the data and forwarding the data. Signals are forwarded along the chain of communication elements 110, 120 and paths 94. The communication element 110, 120 of the non-master patch panels 96 is for inter-panel (within the same rack) connection. The non-master patch panels 96 have only one communication element 110, 120 connected via communication paths 94 to allow data to pass through the communication element 110, 120 to the MCU 48 of the master patch panel 92. The communication paths 94 of the non-master MCU's 48 use the IIC protocol (also known as the I2C bus Inter-IC bus or IIC bus), which can be considered to be a bus. Other formats may also be used. The communication element 110, 120 of the master patch panel 92 is for inter-rack connection. The master patch panels 92 have two communication elements 110, 120 with one of these connected via a communication path 94 to one of the non-master patch panels 96 or the chain of connected non-master patch panels 96 and the other of the two communication elements 110, 120 connected by communication path 112 to either another master patch panel 92 or to the control unit 70. The MCUs 48 of each master patch panel 92 provide a store and forward function as to the state of circuits 40 of that master patch panel 92 as well as a repeater function as to data received from non master patch panels 96. The communication paths 112 of the master MCUs 48 use the RS 485 protocol which is effective over long distances. Other formats may also be used. The signal(s) between patch panels is collected by the rack master patch panel 92 with communication chip 80 which then passes the signals to the control unit 70. The signals may include various types of information such as port and panel identification, (Panel number, Rack number, Port number, etc.) status or any event. After the control unit 70 receives the signals, the control unit 70 can generate the corresponding action such as alarm, reset, instructions, etc.

Figure 15:
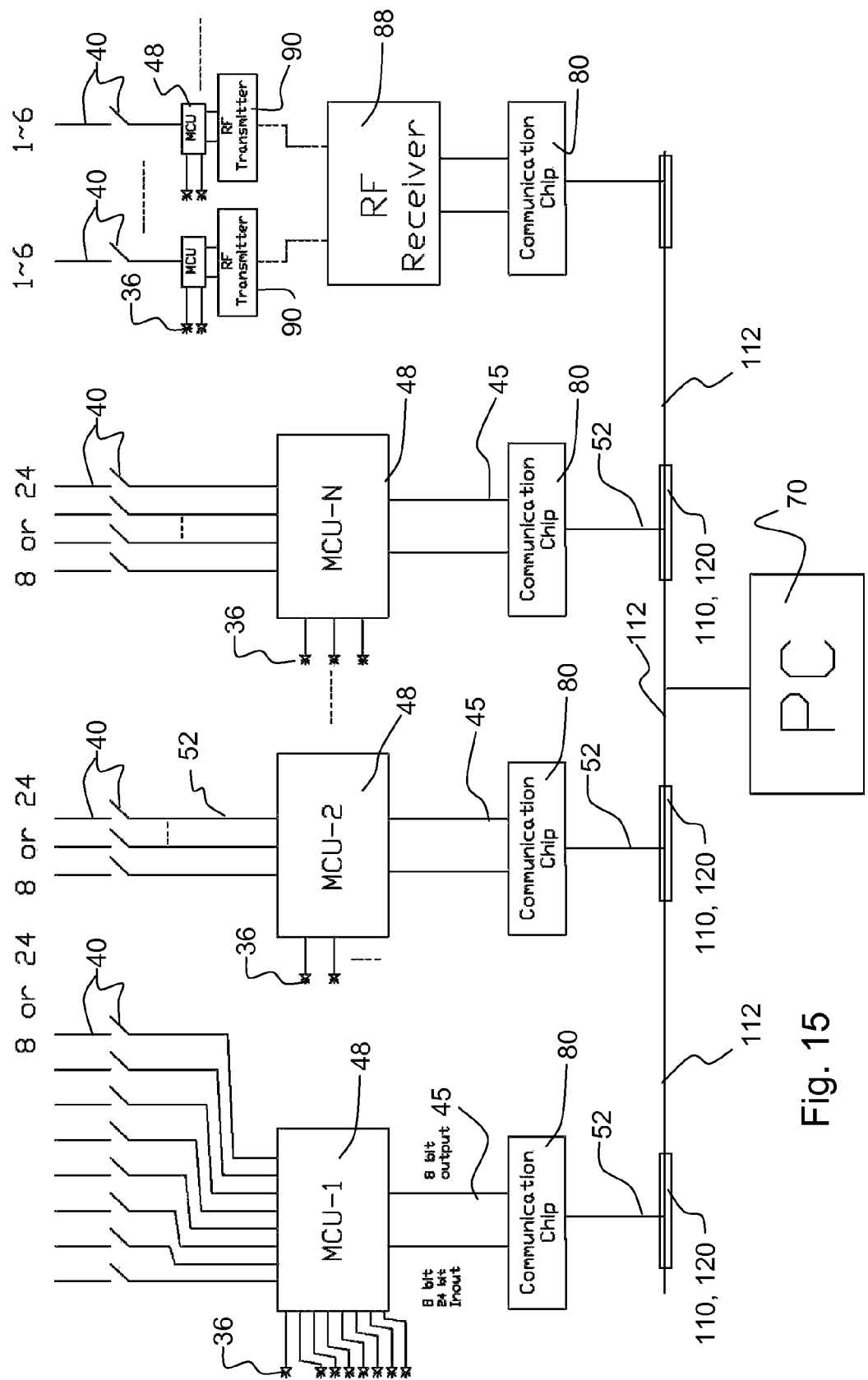
FIG. 15 is a schematic circuit diagram showing various electric detection circuits connected to microcontroller units which are each connected to a central control unit in the form of a personal computer (PC) via a communication chip of a communication unit.

The connection between MCUs 48 and a control unit 70 is schematically shown in FIG. 15. Each MCU 48 is shown connected to detection circuits 40 corresponding to ports (jacks 20) of a patch panel 12, 12'. Depending upon the connection state of a port (jack 20) of the patch panel 12, 12', the MCU 48 receives either no signal in the case of an open circuit 40 or receives a predefined signal based on a closed-circuit 40. When each circuit 40 is closed the MCU 48 actuates a corresponding LED 36 such that it is illuminated. The MCU 48 collects port connection data—information of the plug insertion state of each port—of its panel via detection elements 42. The MCU 48 sends the information to the control unit 70 by communication element 110 or 120 and the communication path 112 using the RS 485 protocol.

FIG. 15 also shows the possibility of an MCU 48 being associated with a radio frequency transmitter 90 to send radio frequency signals as a means for passing port connection data and other data to another MCU or to the control unit 70. The MCU 48 sends data via the RF transmitter 90 which is received via a RF receiver 88 which passes the data to a communication chip 80 which then passes the data using the RS 485 protocol. The RF transmitter 88 may be connected to the MCU circuit board 45. The RF receiver 88 and the communication chip 110 may be suitably positioned and connected to the control unit 70.

Figure 16:
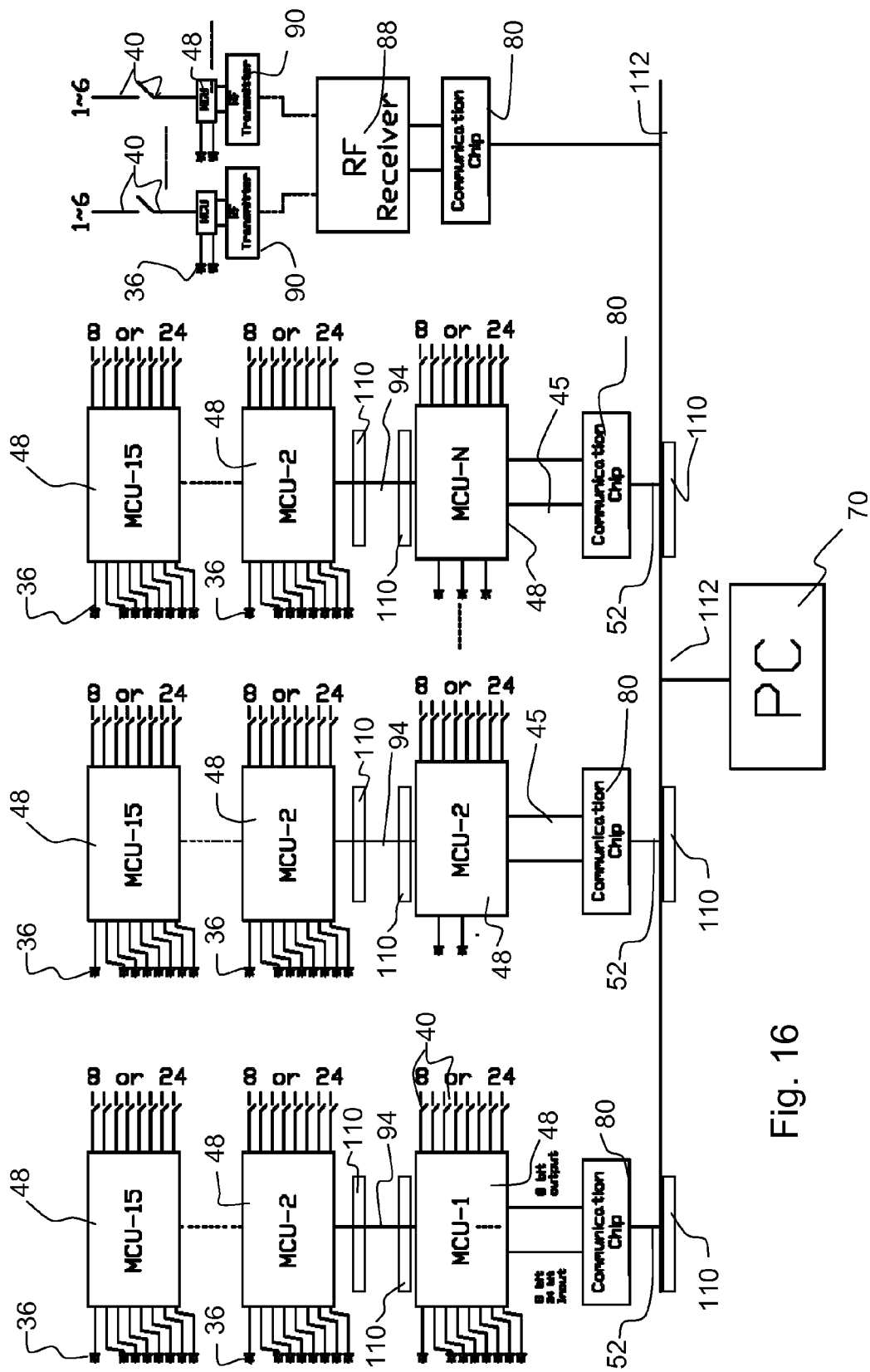
FIG. 16 is a schematic circuit diagram showing various processing units connected together and connected to a central control unit in the form of a personal computer (PC) via a communication chip of a communication unit.

FIG. 16 shows an alternative system arrangement in which the communication elements 110, 120 provide a path for the connection of MCU-1 directly to MCU-2, and MCU-2 directly to MCU-3 and MCU-3 to MCU-N. The last MCU 48 in the chain is the master MCU 48 of the master patch panel 92. At each patch panel 12, 12', signals are received at the respective non master MCU 48. The signal(s) of each MCU 48 are sent or forwarded from the respective non-master MCU 48 to a master MCU 46 functioning as a master for a group of MCUs 46 (for a group of patch panels) via a communication path 94 using the IIC format. The group may be all patch panels on a particular rack 10. The rack master or master MCU 48 passes the signals for the group of non-master MCUs 28 (for the rack 10) to the control unit 70 or to another master MCU 48 via communication path 112 using the RS485 format.

Each of the system embodiments of FIGS. 14 and 15 provide a patch panel 12 with MCU module 46 connected to a central control unit 70. This allows the overall system to maintain statistics and provide information as to the connection status. Every port of each patch panel 12 has an address (identity) recognized by the associated MCU 46. Each communication chip 80 has a specific address or identifier to distinguish each patch panel from each other patch panel 12 in a network. Based on the MCU 48 knowing the origin of the signals from each port (the address), the identification of each port and its status in a panel 12 is known to the control unit 70. With several patch panels 12, extensive information relating to a number of ports (jacks 20) can be provided. This allows the software to indicate connections and organize the connection information of the cabling system for an MIS engineer or user of the system. The extensive information is provided while still using a standard RJ 45 plug and using a removable and replaceable keystone jack 20. With software run at the central control unit 70, the user can be presented with a great deal of information in a simple format.

Particular advantages are provided based on the indicator modules 60 and the MCU module 46 being connectable and disconnectable from the patch panel 12 via the circuit board interface 16. The panel cover 14, the circuit board interface 16, rear cover 17 and frame element 18 are quite robust and may be used without problems or failure for many years. The individual keystone jacks are also robust and may be used without problems or failure for many years. However, each of these may also be disconnected and replaced, such as for changing the wires terminated to the IDCs 22. The LED indicators can fail as can processors and controllers of the MCU. The related communication chips 80 and RF transmitters 90 and receivers 88 are also subject to failure. With the invention, the patch panel structure 12 including keystone jacks 20 can be warranted for large number of years (for example 25 years). Other components are provided in a manner that allows replacement while the patch panel structure 12 including keystone jacks 20 remains in a connected state.

While specific embodiments of the invention have been described in detail to illustrate the application of the principles of the invention, it will be understood that the invention may be embodied otherwise without departing from such principles.

APPENDIX

LIST OF REFERENCE SYMBOLS

8 patch cord
10 rack
12 patch panel
14 patch panel front frame
16 circuit board interface
17 rear cover
18 frame element
19 rear opening
20 individual keystone jack
22 insulation displacement contacts
23 IDC cover
24 exterior latch portion
25 RJ plug
26 labeling section
27 access opening
28 spring contacts
30 plug insertion opening
31 detector opening
32 circuit element first conductive portion
34 circuit element second conductive portion
35 conductive portion
36 indicator
38 plug insertion direction
40 detection circuit
42 detection element
44 MCU module interface
45 microcontroller unit circuit board
46 microcontroller unit module
48 microcontroller unit
50 MCU cover
52 transmission paths
54 openings
56 connection guide circuit board interface
58 power connection
60 indicator module
62 indicator module receiving opening
64 indicator module base
70 central control unit (personal computer).
80 communication chip
88 radio frequency (RF) receiver
90 RF transmitter
92 master patch panel
94 communication path
110 communication element (110 type connector)
112 communication path
120 communication element (wire to board type connector)

What is claimed is:

1. A patch panel used in an intelligent structured cabling system, the patch panel comprising:
a patch panel frame;
an plurality of indicators, each of the indicators being connected to the patch panel frame;
an microcontroller unit (MCU);
a plurality of connectors connected to the patch panel frame, each of the indicators being positioned adjacent to and associated with one of the plurality of connectors;
a detection device including a plurality of detectors, each of the detectors being positioned adjacent to and associated with one of the plurality of connectors for physically detecting a connection state at the associated connector and generating a connection state signal representative of the connection state;
a circuit board interface with a plurality of communication paths including indicator communication paths from each of the plurality of indicators to the MCU carrying signals from the MCU to control each of the plurality of indicators and including detector communication paths from each of the plurality of detectors to the MCU for carrying the connection state signals from the detectors to the MCU, the circuit board interface being connected to the patch panel frame and the MCU being mounted on the patch panel in a fixed position relative to the circuit board interface and relative to the patch panel frame; and
a communication unit connected to the MCU and mounted on the circuit board interface, the communication unit conveying signals between any one of patch panels of a group, between groups of patch panels, between the patch panel and a control unit and between the group of patch panels and the control unit.

2. A patch panel according to claim 1, wherein:
the circuit board interface includes at least one of circuit traces and conductive through holes defining circuit board interface communication paths;
the circuit board interface and the frame define a carrier;
the plurality of indicators are part of an indicator module and the MCU is part of an MCU module;
the carrier includes an MCU interface mounting the MCU to the carrier and connecting the MCU module to the circuit board interface and for disconnecting the MCU module from the circuit board interface for replacement thereof;
the indicator module is removably mounted on the carrier;
the detectors form a part of the circuit board interface
no active components are provided on the indicator communication paths between the MCU and indicator module and the indicator communication paths are only for direct inter-connection of the MCU and indicator module; and
no active components are provided on the detector communication paths between the MCU and detectors and the indicator communication paths are only for direct inter-connection of the MCU and the detectors.

3. A patch panel according to claim 1, wherein:
each of the connectors is a modular female connector with a housing defining a connector opening for receiving a male connector and defining an adjacent detection element opening, the modular female connector being mounted on the frame; and
each detector of extends into one of the connector openings by passing through one of the detection element openings upon mounting the modular female connector on the frame for detecting the insertion of the plug in the connector opening.

4. A patch panel according to claim 1, wherein:
the connector is a female connector with housing defining a connector opening for receiving a male connector; and
each detection element conveys one of two signals to the MCU through the circuit board interface, with one of the two signals indicating that a plug is inserted into the female connector and with another of the two signals indicating the plug is removed from the female connector.

5. A patch panel according to claim 1, wherein the indicators are part of an indicator module that is connectable to the patch panel frame and is disconnectable from the patch panel frame for replacement thereof.

6. A patch panel according to claim 2, wherein:
each connector is a modular female connector with a housing defining a connector opening for receiving a plug and defining an adjacent detection element opening, each modular female connector being mounted on the frame;
each detection element forming a part of the circuit board interface;
each detection element extends into the corresponding connector opening through the detection element opening upon mounting the modular female connector on the frame for detecting the insertion of the corresponding plug in the corresponding connector opening; and
each of the plurality of modular female connectors that are mounted on the frame are connectable to the patch panel frame and are disconnectable from the patch panel frame for replacement thereof.

7. A patch panel according to claim 1, wherein the communication unit comprises an RS 485 interface with an RS485 communications port.

8. A patch panel according to claim 1, wherein the control unit is a central control unit comprising a computer.

9. A patch panel according to claim 3, wherein the female connector is a registered jack (RJ) modular connector.

10. An intelligent structured cabling system comprising:
a plurality of patch cords, each of the patch cords having a male connector at one end and another male connector at another end;
a patch panel comprising:
a patch panel frame;
an indicator module connected to the patch panel frame, the indicator module comprising a plurality of indicators;
an microcontroller unit (MCU) module;
a plurality connectors connected to the patch panel frame, each of the indicators being positioned adjacent to and associated with a respective one of the plurality of connectors;
a plurality of detection devices, each detection device being positioned adjacent to and associated with a respective one of the plurality of connectors for detecting a physical presence of a patch chord male connector and generating a connection state signal to signal a connection state at a respective one of the plurality of connectors;
a circuit board interface with a plurality of communication paths including indicator communication paths from each of the plurality of indicators to the MCU module to send control signals from the MCU to each of the plurality of indicators and including detector communication paths from each of the plurality of detection devices to the MCU module for receiving the connection state signals from the detectors at the MCU, the circuit board interface being connected to the patch panel frame and the MCU being mounted on the patch panel in a fixed position relative to the circuit board interface and relative to the patch panel frame; and
a communication unit connected to the MCU and mounted relative to the circuit board interface, the communication unit conveying signals between at least one of the patch panels of a group, between groups of patch panels, between the patch panel and a control unit and between the group of patch panels and the control unit.

11. A system according to claim 10, wherein:
the circuit board interface and the frame define a carrier;
the indicator module and the MCU module are removably mounted on the carrier;
the detection devices form a part of the circuit board interface;
no active components are provided on the indicator communication paths between the MCU and indicator module and the indicator communication paths are only for direct inter-connection of the MCU and indicator module; and
no active components are provided on the detector communication paths between the MCU and detectors and the indicator communication paths are only for direct inter-connection of the MCU and the detectors.

12. A system according to claim 11, wherein
each connector is a modular female connector with a housing defining a connector opening for receiving a plug and an adjacent detection device opening, the modular female connector being mounted on the frame; and
each detection device is inserted into the connector opening through the detection device opening upon mounting the modular female connector on the frame for detecting the insertion of the plug in the connector opening.

13. A system according to claim 11, wherein:
the connector is a female connector with a housing defining a connector opening for receiving a plug; and
the connection state signal of the detection devices comprises one of two signals to control the indicators via the MCU module through the circuit board interface, with one of the two signals indicating that a plug is inserted into the female connector and with another of the two signals indicating the plug is removed from the female connector.

14. A system according to claim 11, wherein the indicator module is connectable to the patch panel frame and is disconnectable from the patch panel frame for replacement thereof.

15. A system according to claim 11, wherein:
each connector is a modular female connector with a housing defining a connector opening for receiving a plug and an adjacent detection device opening, each modular female connector being mounted on the frame;
each detection device forms a part of the circuit board interface and is associated with a corresponding one of the female connectors;
each detection device is inserted into the corresponding connector opening through the detection device opening upon mounting the modular female connector on the frame for detecting the insertion of the corresponding plug in the corresponding connector opening; and
each of the plurality of modular female connectors that are mounted on the frame is connectable to the patch panel frame and is disconnectable from the patch panel frame for replacement thereof.

16. A system according to claim 10, wherein the communication unit comprises an RS 485 interface with an RS485 communications port.

17. A system according to claim 10, wherein the control unit is a central control unit comprising a computer.

18. A system according to claim 10, wherein:
each connector is a registered jack (RJ) modular female connector;

each of the patch cords comprises 2 to 8 communication wires with no additional signal wire.

19. A system according to claim 10, wherein:

the circuit board interface includes circuit traces defining the communication paths;

the circuit board interface includes an MCU interface for connecting the MCU module to the circuit board interface and for disconnecting the from the MCU module from the circuit board interface for replacement thereof; and the circuit board interface includes the detection devices as parts of the circuit board interface.

20. A patch panel for an intelligent structured cabling system, the patch panel comprising:

a patch panel frame;

a plurality of connectors connected to the patch panel frame;

a plurality of indicators connected to the patch panel frame;

a plurality of detector elements for detecting a physical presence of a patch chord male connector in a connection state at each connector and generating a connection state signal representative of the connection state, each of the detector elements being associated with one of the connectors and each of the indicators being associated with one of the connectors;

an microcontroller unit (MCU) module with contacts;

a circuit board interface comprising indicator communication paths, each of the indicator communication paths being connected to one of the plurality of indicators and detector communication paths, each of the detector communication paths being connected to one of the plurality of detector elements;

an MCU interface fixed relative to the circuit board interface, the MCU interface being connected to the circuit board interface and being connected to each of the indicator communication paths and controlling the plurality of indicators with signals sent from the MCU to the indicators over the indicator communication paths and the MCU interface being connected to each of the detector communication paths and receiving connection state signals from the plurality of detector elements via the detector communication paths of the circuit board interface, the MCU interface defining a mount for the MCU, for mounting the MCU relative to the circuit board interface and for connecting the MCU to the circuit board interface with contacts of the MCU interface connecting with contacts of the MCU and for disconnecting the MCU from the circuit board interface for replacement thereof; and a communication unit mounted on the circuit board interface and connected to the MCU via the communication paths, the communication unit having a communication port associated therewith, the communication unit conveying signals, by a connection via the communication port, between any one of patch panels of a group, between groups of patch panels, between the patch panel and a control unit and between the group of patch panels and the control unit.

\* \* \* \* \*